(12) United States Patent
Chikaraishi

(10) Patent No.: US 6,328,310 B1
(45) Date of Patent: Dec. 11, 2001

(54) METHOD OF PREVENTING WATER LEAKAGE WITH WATERPROOF SEAL

(75) Inventor: Taisuke Chikaraishi, Numazu (JP)

(73) Assignee: Acacia Kakou Co., Ltd., Shizouka-Ken (JP)

(*) Notice: Subject to any disclaimer, the term of this patent is extended or adjusted under 35 U.S.C. 154(b) by 0 days.

(21) Appl. No.: 09/496,449

(22) Filed: Feb. 2, 2000

(30) Foreign Application Priority Data

Mar. 2, 1999 (JP) .................................................. 11-025980

(51) Int. Cl.$^7$ ...................................................... F16L 17/00
(52) U.S. Cl. ........................ 277/314; 277/316; 277/605; 277/646; 277/910
(58) Field of Search .................... 277/312, 314, 277/316, 934, 605, 626, 627, 645, 646, 650, 652, 910; 405/279

(56) References Cited

U.S. PATENT DOCUMENTS

| | | | |
|---|---|---|---|
| 2,309,658 | * | 2/1943 | Miller . |
| 3,427,776 | * | 2/1969 | Lake et al. ...................... 52/204.591 |
| 3,491,825 | * | 1/1970 | Peterson et al. . |
| 3,821,340 | * | 6/1974 | Marks ..................................... 264/46 |
| 4,160,464 | * | 7/1979 | Ballinget ................................. 138/93 |
| 4,296,933 | * | 10/1981 | Tolliver . |
| 4,443,019 | * | 4/1984 | Ishido et al. . |
| 4,449,713 | * | 5/1984 | Ishido et al. .......................... 277/312 |
| 4,558,875 | * | 12/1985 | Yamaji et al. ........................ 277/312 |
| 4,993,722 | * | 2/1991 | Gundy . |
| 5,290,045 | * | 3/1994 | Terauchi et al. ..................... 277/312 |
| 5,384,370 | * | 1/1995 | Vondracek et al. .................. 525/209 |
| 5,423,630 | * | 6/1995 | Imoto et al. .......................... 405/154 |
| 5,901,962 | * | 5/1999 | Wambeke . |
| 5,938,375 | * | 8/1999 | Wheeler, Jr. et al. ............... 405/274 |

FOREIGN PATENT DOCUMENTS

| | | | | |
|---|---|---|---|---|
| 57111336A | * | 7/1982 | (JP) . | |
| 57-204390 | | 12/1982 | (JP) . | |
| 57-204391 | | 12/1982 | (JP) . | |
| 62-82109 | * | 4/1987 | (JP) | ...................................... 405/53 |
| 363194929A | * | 8/1988 | (JP) . | |
| 407151232A | * | 11/1993 | (JP) . | |
| 06-249377 | | 9/1994 | (JP) . | |
| 9-133272 | | 11/1995 | (JP) . | |
| 02000081144A | * | 3/2000 | (JP) . | |
| 2000-87699 | * | 3/2000 | (JP) . | |
| 2000-88178 | * | 3/2000 | (JP) . | |

OTHER PUBLICATIONS

"A Study of Durability of Water Swelling Seal", The 21st Forum on Polymer and Water, Nov. 25, 1983, The Hall of "the Chemical Society of Japan" in Tokyo, The Society of Polymer Science, Japan.

* cited by examiner

*Primary Examiner*—Lynne H. Browne
*Assistant Examiner*—Alison K. Pickard
(74) *Attorney, Agent, or Firm*—Marshall, Gerstein, & Borun

(57) ABSTRACT

A method of preventing water leakage which comprises the steps of interposing a waterproof seal which consists of a hollow, water-absorbing, swelling rubber piece covered with a fabric tube in a clearance between the ends of pipes or planks to be joined together, injecting air into the hollow of the rubber piece and thereby block off the clearance and obtain a contacting surface pressure greater than a leakproof pressure just needed, and thereafter allowing the water-absorbing, swelling rubber piece to swell with water. The waterproof seal may have an inlet valve through which air is forced into the hollow, or the seal may be pierced through with a hollow needle from the outside to inject air into the hollow.

4 Claims, 4 Drawing Sheets

METHOD OF PREVENTING WATER LEAKAGE WITH WATERPROOF SEAL

BACKGROUND OF THE INVENTION

1. Field of the Invention

This invention relates to a method of preventing water leakage with a waterproof seal inserted in a clearance for connection between pipe and pipe to be used in the soil or under water or between sheet piles to be driven into the ground.

2. Prior Art

Methods of preventing water leakage by use of water-absorbing, expandable rubber (hereinafter called water-swelling rubber) are already known. They use the rubber, for example, as packings for water intake pipes and effluent pipes to be embedded in the ground or laid on the seabed, for flanged joints of pipings for water supply, Hume pipes, propelling pipes, and U-drains; and as segment seals for sheet piles and shields for structures. Such water-swelling rubber pieces absorb surrounding water and swell to volumes large enough to seal joints of piping and the like. Japanese Patent Application Kokoku Nos. 58-27435 and 58-27436 disclose waterproof seals of a structure consisting of a water-swelling rubber piece filled in a fabric tube which has a lower expansion rate but permits permeation of water to constrain the rubber expansion toward the contacting surfaces and allow the rubber to absorb water until it attains a sufficient leakproof pressure. Japanese Patent Application Kokai No. 6-249377 introduces a pipe joint structure using a packing of water-swelling rubber for the connection of water intake pipings installed under water and the like. It claims that the structure facilitates pipe joining work. Actually, however, it usually takes as long as about one week before such seals used with Hume pipes and the like in the soil or on the seabed absorb water to develop an adequate leakproof pressure (generally 2–20 kgf/cm$^2$, preferably 5–6 kgf/cm$^2$). This can retard the whole work, and the problem is how to shorten the above time period.

In an attempt to solve the problem, Japanese Patent Application Kokai No. 9-133272 reveals a method of obtaining an adequate leakproof pressure by use of a hollow seal packed with a synthetic resin or other filler material. It is not easy, however, to transport such filler material and filling equipment to the site of work and complete the seal on site. Therefore, a simpler approach to the problem has been sought.

SUMMARY OF THE INVENTION

It is an object of the present invention to shorten the time period required to attain an adequate leakproof pressure by a waterproof seal inserted in a clearance of joint between pipe and pipe to be installed in the soil or under water or between sheet piles to be driven into the ground for the prevention of water leakage, and also to permit the work to be performed with ease.

The invention resides, in essence, in a method of preventing water leakage which comprises the steps of interposing a waterproof seal which consists of a hollow, water-absorbing, swelling rubber piece covered with a fabric tube in a clearance between the ends of pipes or planks to be joined together, injecting air into the hollow of the rubber piece and thereby block off the clearance and obtain a contacting surface pressure greater than a leakproof pressure just needed, and thereafter allowing the water-absorbing, swelling rubber piece to swell with water. The waterproof seal may have an inlet valve through which air is forced into the hollow. Alternatively, the seal may be pierced through with a hollow needle from the outside to inject air into the hollow.

DESCRIPTION OF THE PREFERRED EMBODIMENTS

Figure 1:
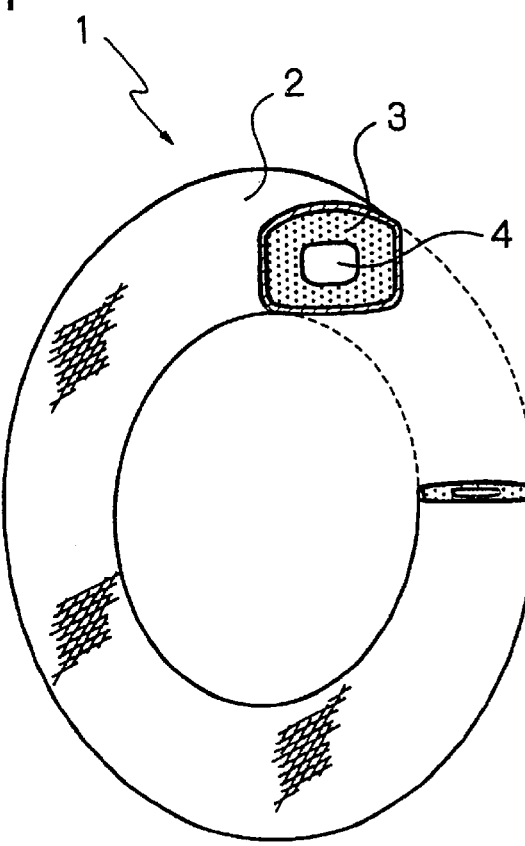
FIG. 1 is a schematic view of an annular waterproof seal embodying the present invention.

As shown in FIG. 1, the waterproof seal according to the present invention has a structure 1 consisting of a water-swelling rubber 3 tightly packed in a fabric tube 2, with a hollow 4 provided throughout. It may take the form of a ring or an elongated piece. Its cross sectional contour is square or oval or both. The seal has a height (the length of the seal as measured in the direction perpendicular to the contacting surfaces being sealed) shorter than its width. A ring-shaped piece embodying the invention is illustrated in FIG. 1. The ring usually has a radius of 250 to 3000 mm, a width of 26 to 34 mm, and a height of 13 to 19 mm. The hollow inside may take a circular, elliptical, or whatever other shape desirable, generally with a diameter of 5 to 10 mm. An example is a proprietary product with a trade name of "Acacia seal" manufactured by Acacia Kakou Co. Its performance (in conformity with JIS K6353) includes, e.g.; hardness, 55 HS; tensile strength, 100 kg/cm$^2$; elongation, 90%; and swelling rate, 60%.

Figure 2:
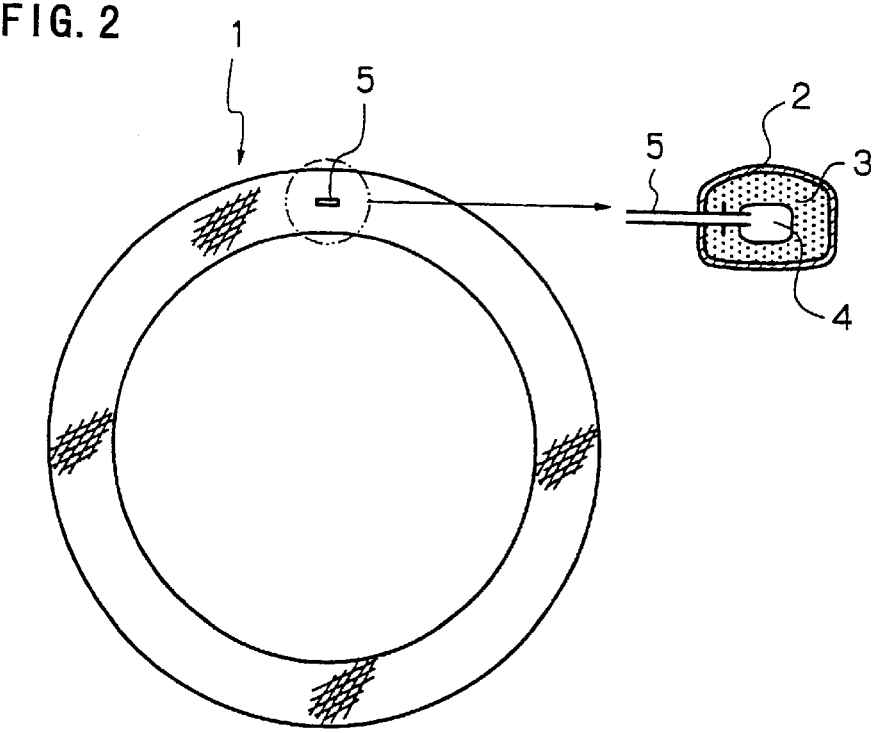
FIG. 2 is a schematic view of an annular waterproof seal of the invention equipped with an inlet valve.

The waterproof seal may have an inlet valve 5 as shown in FIG. 2 to help force air into the hollow. The inlet valve may be of any structure only if it allows air to be filled in substantially to a leakproof pressure and then prevents leakage of air. It may be replaced by any other means provided that the latter has the same function. Where an inlet valve or the like is not used, a hollow needle may be employed instead. The needle is pierced from the outside through the rubber to inject air into the follow. The pierced rubber recovers the textural integrity by its own elasticity and prevents air leakage. Since water-swelling rubber swells with water to compensate for any deficiency of leakproof pressure, air may gradually come out of the hollow afterwards. In the latter case, the waterproof seal further absorbs water and swells to make up for the loss of contacting surface pressure due to the pneumatic pressure drop in the hollow, and thereby maintains an effective contacting surface pressure.

The use of air for the pressure increase in the hollow renders it possible to obtain a uniform contacting surface pressure by air injection at one point and achieve a consistent leakproof effect.

Leakproof pressure required varies with the structure, surface condition, and environment of the joint between pipes or planks to be protected against leakage, the structure of the waterproof seal used, and other factors. It is generally in the range of 2 to 20 kgf/cm$^2$, mostly in the range of 5 to 6 kgf/cm². Thus the pneumatic pressure to be exerted inside the hollow corresponds to the leakproof pressure. The time needed to attain the leakproof pressure also varies with the above factors. Likewise, the time a waterproof seal according to the invention requires to achieve its leakproof effect by means of the pneumatic pressure varies too, but usually is of the order of one week. After that, the water-swelling rubber piece swells to a size large enough to sustain the necessary leakproof effect for a long period.

Water-swelling rubber softens and swells on water absorption, but in a dry state out of contact with water it retains rubber-like elasticity. In general it is a mixture of water-absorbing resin and rubber. The water-absorbing resin is a synthetic polymer which by nature absorbs water and swells as soon as it comes in contact with water to form a gel of the water contained throughout. Structurally, it is a water-soluble resin slightly crosslinked (tridimensionallized) to be insoluble in water, designed to exhibit a remarkable water absorption capacity. There are various types including starch, cellulose, polyvinyl alcohol, acrylic, maleic anhydride, and hydrophilic polyurethane types. For the purposes of the invention, the hydrophilic polyurethane type is preferred. Out of the hydrophilic polyurethanes, polyether polyol containing a high percentage (e.g., 10% or more) of the oxyethylene unit is desirable. Suitable rubbers for the present invention are chloroprene rubber and styrene-butadiene-styrene block copolymer rubber. Among typical water-swelling rubbers are a product of Bridgestone Corp. marketed under the trade designation of "Supersealant", Nichirin Gomu Kogyo's "AE Pitaseal", Oji Rubber Chemical's "Aquachel", CI Chemical's "Vinon ATR", Throughbond's "Superpolysealer 5000W", Nippon Seal Pack's "Waterseal" and "Quarterband", Oyo Chishitsu's "Niceshawl", and Asahi Denka Kogyo's "Adeka Ultraseal".

Suitable for use as the fabric tube is one woven of a fiber having a low breaking strength (5% or less). Concrete examples are high-strength polyester fiber and aramide fiber. From the viewpoint of deterioration in watery environments, aramide fiber is preferable, and a fabric tube of this fiber coated with a hydrophilic urethane is more preferable (cf. Taisuke Chikaraishi, "A study of durability of water-absorbing, swelling seal materials," the 21st Forum on Polymer and Water held by the High Polymer Society on Nov. 25, 1983). Examples of aramide fiber are Du Pont's "Keller" and Teijin's "HM-50 Technola". Water-swelling rubber absorbs water through the surrounding texture of the fabric tube. Since the water-swelling rubber is covered with the fabric tube, the seal can effectively swell perpendicularly to the contacting surfaces and exhibit a great leakproof effect when the pneumatic pressure in the hollow has been increased or when the water-swelling rubber has swollen with water absorbed.

The invention will be described in detail below in connection with embodiments thereof, which are illustrative and not restrictive.

Figure 3:
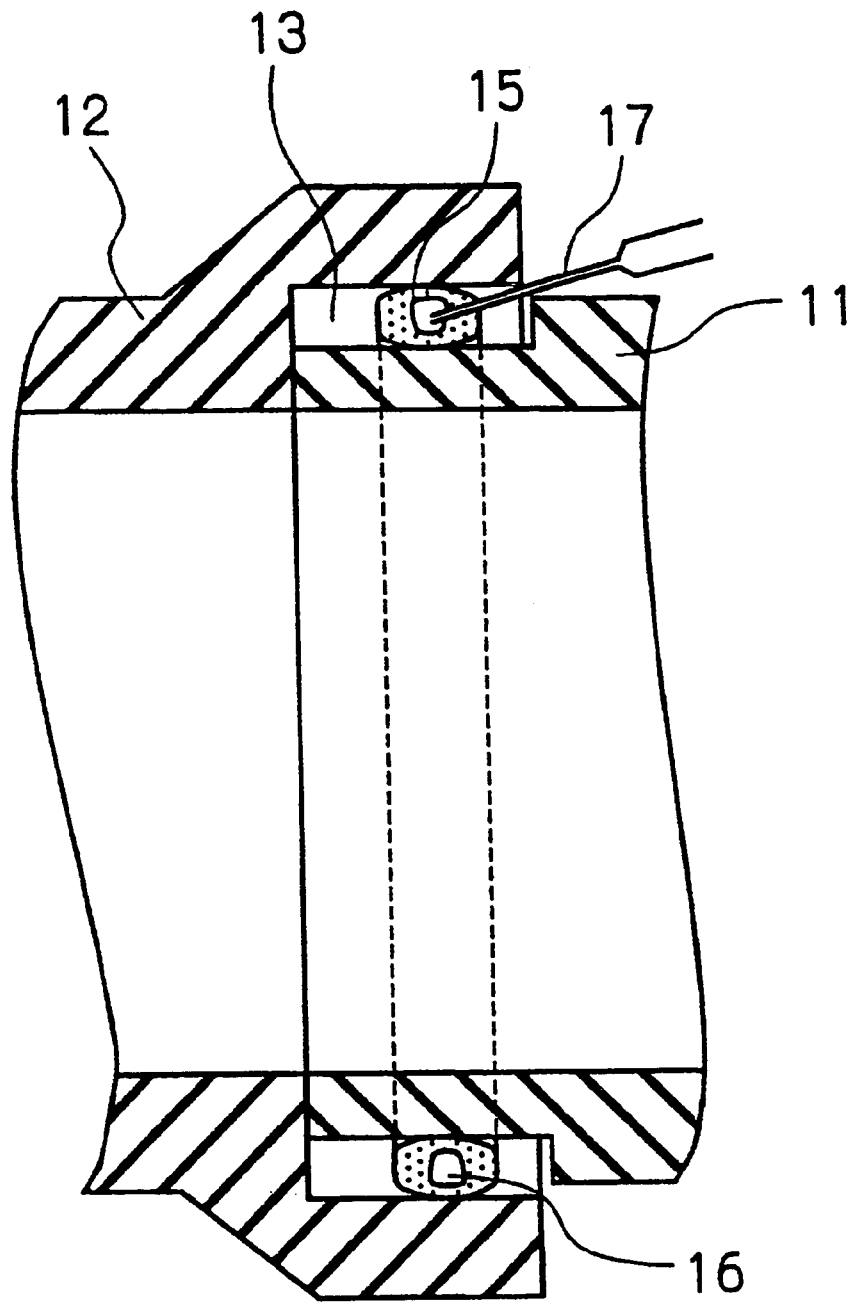
FIG. 3 is a fragmentary sectional view of a Hume pipe joint incorporating an embodiment of the invention.
Figure 4:
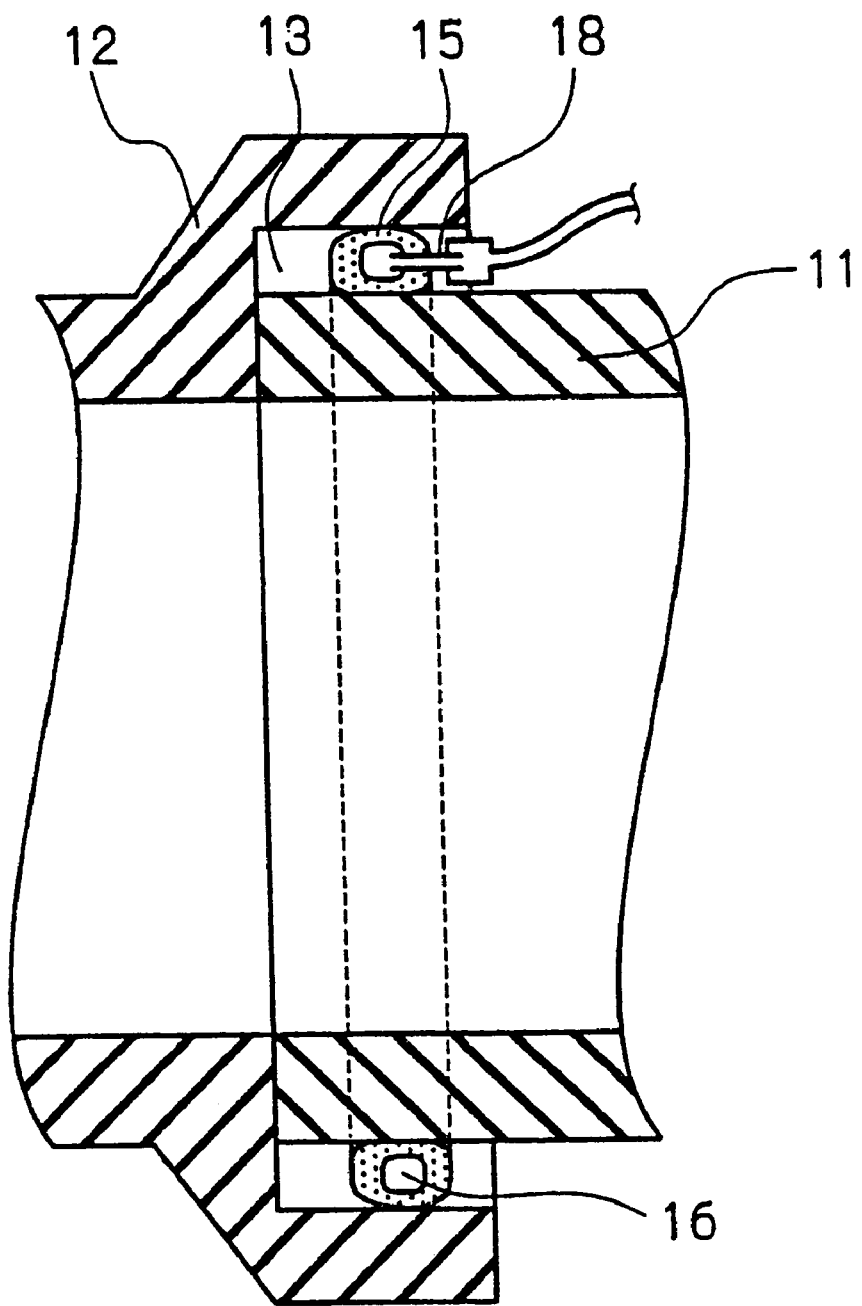
FIG. 4 is a fragmentary sectional view of a Hume pipe joint incorporating another embodiment of the invention.
Figure 5:
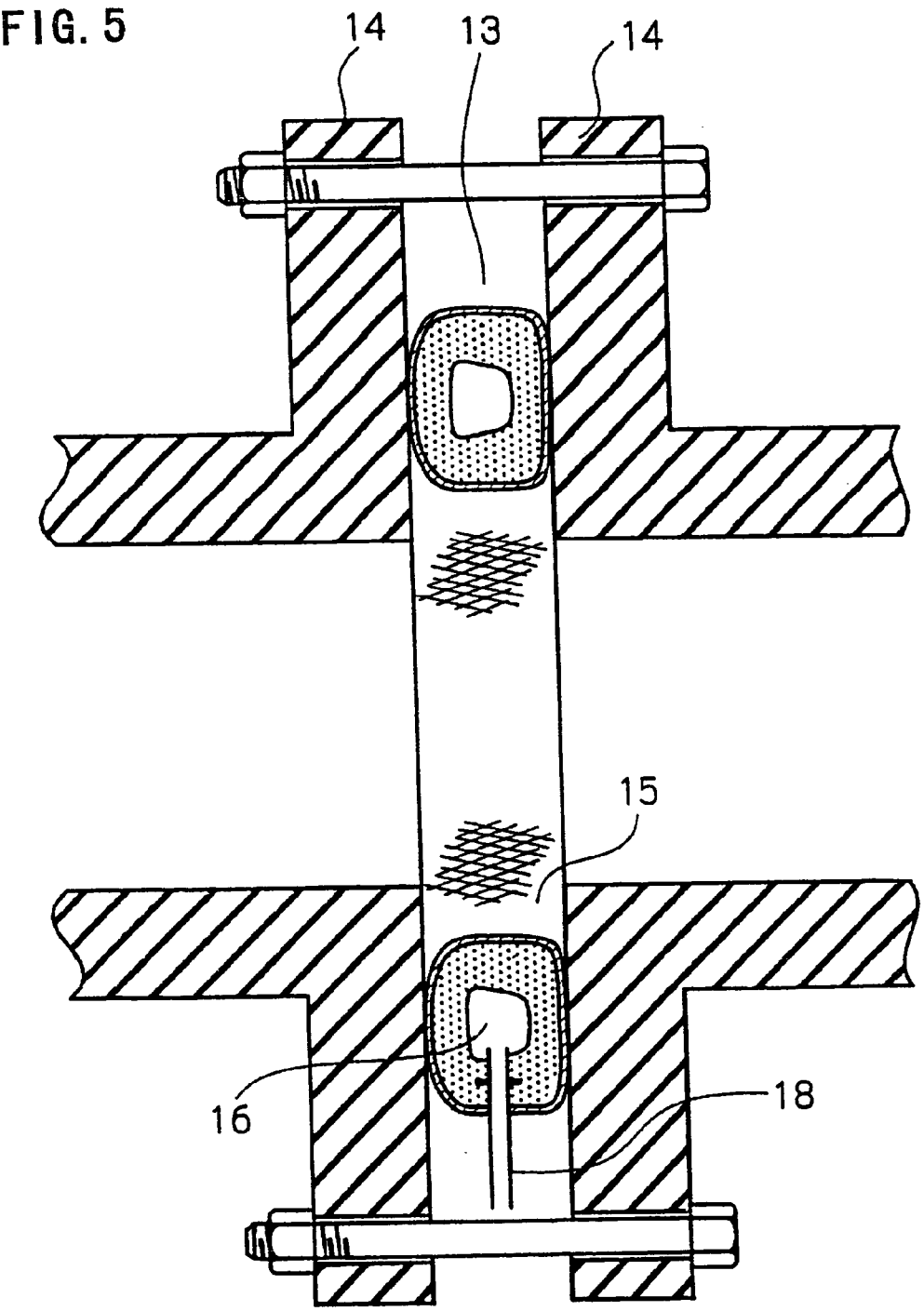
FIG. 5 is a fragmentary sectional view of a flanged joint incorporating still another embodiment of the invention.

FIG. 3 shows a joint between Hume pipes being joined together. The parts being joined provide a clearance 13 in between. A waterproof seal 15 is fitted or wound round a male socket 11 of a Hume pipe and is inserted in a slightly deformed state in the clearance 13 between the outer wall surface of the male socket 11 and the inner wall surface of a female socket 12. A hollow needle 17 for air injection is then stuck into the waterproof seal 15 to force air into its hollow 16. When an appropriate pressure has been reached, the needle 17 is drawn off. The pneumatic pressure at that time is about 2 to 20 kgf/cm², preferably about 5 to 6 kgf/cm². The hollow 16 is surrounded by soft, flexible water-swelling rubber, whose elasticity limits the leak of air after the withdrawal of the needle to a minimum. A modified form of the joint is shown in FIG. 4. It differs from the structure illustrated in FIG. 3 in that here is provided an inlet valve 18 in communication with the hollow 16. Air is forced through the inlet valve 18 into the hollow and, upon arrival at a proper pneumatic pressure, the valve is closed. The air under pneumatic pressure inflates the hollow 16. Since the waterproof seal 15 having a contour of square, oval, or a combination of the shapes is covered with a fabric tube of lower elongation at break, the seal cross section approaches a circle with the pressure increase, with consequent application of the pneumatic pressure in the direction perpendicular to the contacting surfaces of the joint. The waterproof seal 15 thus blocks off the clearance 13 and provides a contacting surface pressure greater than the leakproof pressure just needed.

The water-swelling rubber of the waterproof seal 15 takes up surrounding water from the clearance and swells gradually. However, because the seal 15 is covered with a fabric tube, the rubber is not able to absorb more than a given amount of water and hence has no possibility of increasing the contacting surface pressure to excess. Should air leak little by little from the hollow, the waterproof seal 15 would swell accordingly to compensate for the decrease of the contacting surface pressure due to the pneumatic pressure loss in the hollow. Here again, therefore, an effective contacting surface pressure is maintained.

While the waterproof seal of the invention has been described as applied to Hume pipes, in the form of an endless ring fitted to socket ends of the pipes, the seal may alternatively take the form of a bar that can be wound round the tube ends.

As has been described above, the waterproof seal according to the invention obtains a uniform contacting surface pressure and thereby immediately achieves a satisfactory leakproof effect, in a very simple way of air injection at a single point into the hollow of the seal. For a long period of time it retains the adequate leakproof effect owing to consistent water absorption by the water-swelling rubber of the seal.

What is claimed is:

1. A method of preventing water leakage which comprises the steps of interposing a waterproof seal which consists of a hollow, water-absorbing, swelling rubber piece covered with a fabric tube in a clearance between the ends of pipes or planks to be joined together, injecting air into the hollow of the rubber piece and thereby block off the clearance and obtain a contacting surface pressure greater than a leakproof pressure just needed, and thereafter allowing the water-absorbing, swelling rubber piece to swell with water.

2. A method according to claim 1, wherein the waterproof seal has an inlet valve through which air is forced into the hollow.

3. A method according to claim 1, wherein the waterproof seal is pierced through with a hollow needle from the outside to inject air into the hollow.

4. A method according to claim 1, wherein the fabric tube is made from a woven fabric of fibers having a breaking strength of 5% or less.

* * * * *